(12) United States Patent
Lawn

(10) Patent No.: US 11,266,069 B2
(45) Date of Patent: Mar. 8, 2022

(54) CANE PICKUP AND SEPARATION AUGERS

(71) Applicant: Steven Lawn, Wantirna South (AU)

(72) Inventor: Steven Lawn, Wantirna South (AU)

(73) Assignee: Steven Lawn, Wantirna South (AU)

( * ) Notice: Subject to any disclaimer, the term of this patent is extended or adjusted under 35 U.S.C. 154(b) by 0 days.

(21) Appl. No.: 15/734,206

(22) PCT Filed: Jun. 3, 2019

(86) PCT No.: PCT/AU2019/000070
§ 371 (c)(1),
(2) Date: Dec. 1, 2020

(87) PCT Pub. No.: WO2019/227125
PCT Pub. Date: Dec. 5, 2019

(65) Prior Publication Data
US 2021/0219494 A1 Jul. 22, 2021

(30) Foreign Application Priority Data
Jun. 1, 2018 (AU) ................................ 2018901966

(51) Int. Cl.
*A01D 45/10* (2006.01)
*A01D 63/02* (2006.01)

(52) U.S. Cl.
CPC ............... *A01D 45/10* (2013.01); *A01D 63/02* (2013.01)

(58) Field of Classification Search
CPC ......... A01D 45/10; A01D 63/02; A01D 65/00
See application file for complete search history.

(56) References Cited

U.S. PATENT DOCUMENTS 4,722,174 A * 2/1988 Landry .................. A01D 45/10
56/119
5,816,036 A * 10/1998 Caillouet ............... A01D 45/10
56/63

(Continued)

FOREIGN PATENT DOCUMENTS

CN 101073298 A 11/2007
CN 102498824 A 6/2012

(Continued)

OTHER PUBLICATIONS

International Search Report for International Application No. PCT/AU2019/000070, dated Aug. 26, 2019, 7 pages.

(Continued)

*Primary Examiner* — Arpad Fabian-Kovacs
(74) *Attorney, Agent, or Firm* — TraskBritt

(57) ABSTRACT

A cane pickup and separation device mountable to a vehicle, the front of which is depicted in FIG. 1 and identified by reference No. 2. The device includes at least two sorting augers with auger tips, a frame, a separation wall, and a pickup spiral. The sorting augers each have auger tips that are adapted to be positioned slightly above ground level. The sorting augers diverge relative to one another and are inclined upwardly and rearwardly at similar inclined angles $\theta$ to the horizontal to define a diverging gap. Behind the augers is the upwardly and rearwardly inclined separation wall. The separation wall is rearward of the pair of augers and extends substantially across the diverging gap. The frame is mountable to the vehicle and is adapted to support the pair of sorting augers and the separation wall. The device further includes at least one pickup spiral set at a shallower angle $\pi$ inclination to the horizontal than the steeply inclined angle $\theta$.

17 Claims, 15 Drawing Sheets

(56) References Cited

U.S. PATENT DOCUMENTS

| | | | | |
|---|---|---|---|---|
| 6,076,340 | A * | 6/2000 | Fowler | A01D 45/10 56/13.9 |
| 6,745,550 | B1 * | 6/2004 | Hinds | A01D 45/10 56/13.3 |
| 9,781,880 | B2 * | 10/2017 | Cleodolphi | A01D 63/02 |
| 10,932,412 | B2 * | 3/2021 | Richard | A01D 45/10 |
| 2010/0307121 | A1 | 12/2010 | Marchini | |
| 2015/0359177 | A1 * | 12/2015 | Richard | A01D 63/04 56/14.7 |
| 2016/0135365 | A1 * | 5/2016 | Cleodolphi | A01D 34/006 56/10.2 E |
| 2016/0150730 | A1 * | 6/2016 | Mello | A01D 45/10 56/11.9 |
| 2017/0000026 | A1 | 1/2017 | Seki et al. | |
| 2017/0112063 | A1 | 4/2017 | Craig | |
| 2017/0280626 | A1 | 10/2017 | Bertino | |
| 2018/0338423 | A1 * | 11/2018 | Lucca | A01D 41/127 |
| 2018/0338426 | A1 * | 11/2018 | Seki | A01D 67/00 |
| 2018/0352744 | A1 * | 12/2018 | Lucca | A01D 45/10 |

FOREIGN PATENT DOCUMENTS

| | | |
|---|---|---|
| CN | 106385983 A | 2/2017 |
| JP | S58167529 A | 10/1983 |
| JP | H06319354 A | 11/1994 |
| JP | 2009261273 A | 11/2009 |
| WO | 2011/130678 A1 | 10/2011 |
| WO | 2014/138834 A1 | 9/2014 |
| WO | 2018/092764 A1 | 5/2018 |

OTHER PUBLICATIONS

International Written Opinion for International Application No. PCT/AU2019/000070, dated Aug. 26, 2019, 9 pages.

International Preliminary on Patentability for International Application No. PCT/AU2019/000070, dated May 15, 2020, 12 pages.

* cited by examiner

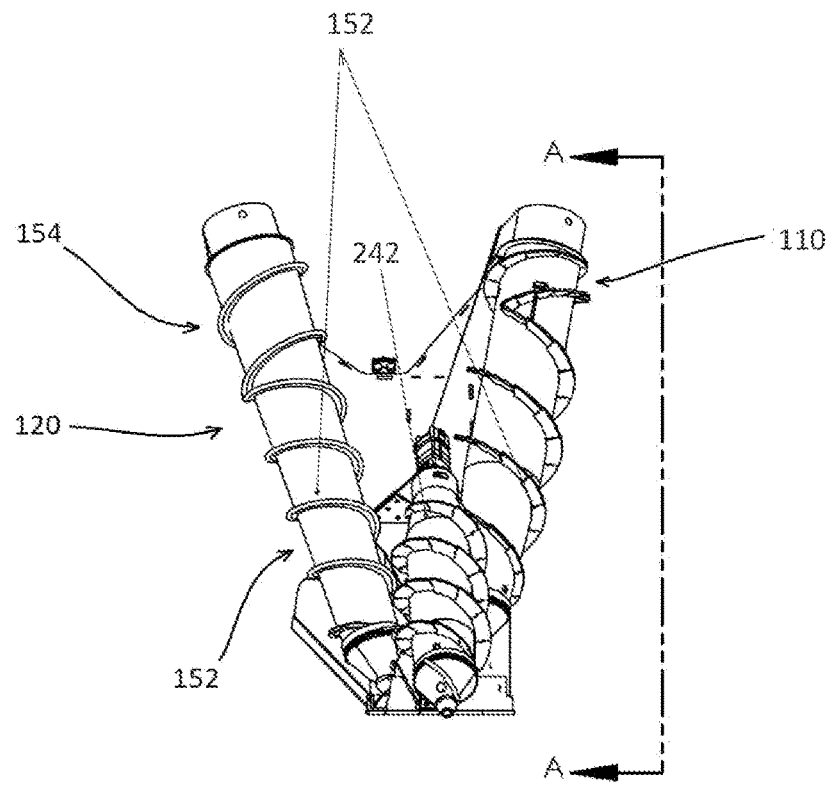
Fig. 1c
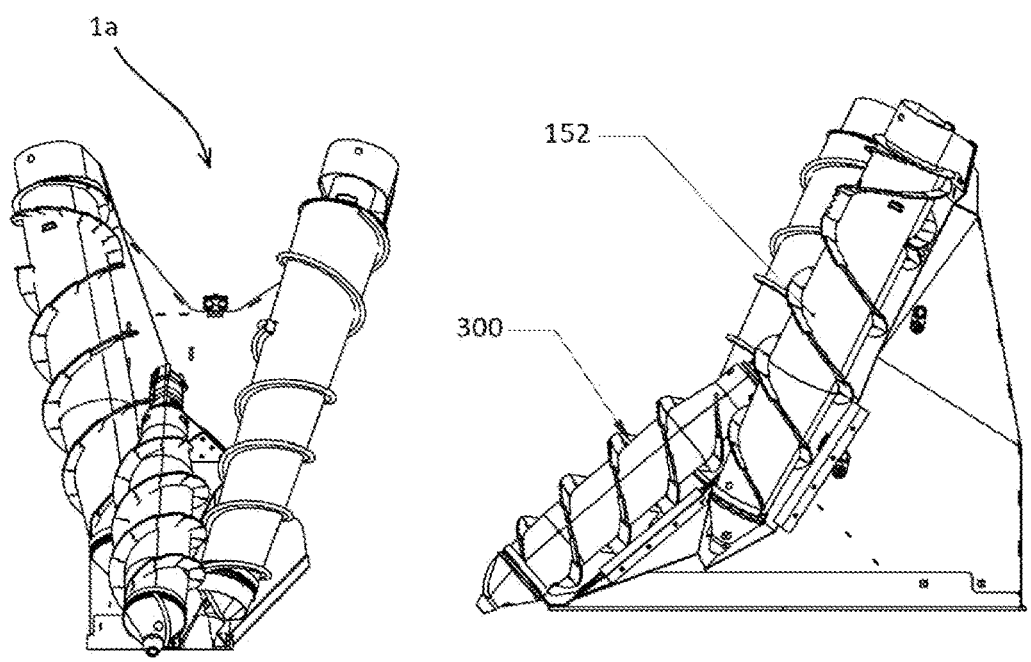
Fig. 1d
Fig. 1e
SECTION A-A

SECTION B-B

SECTION C-C

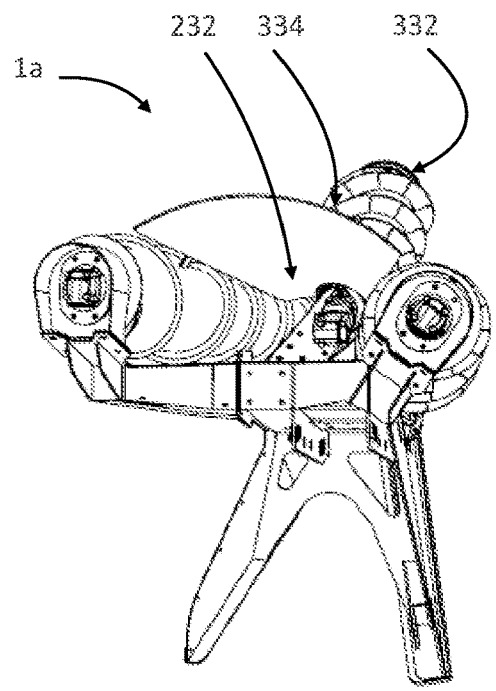
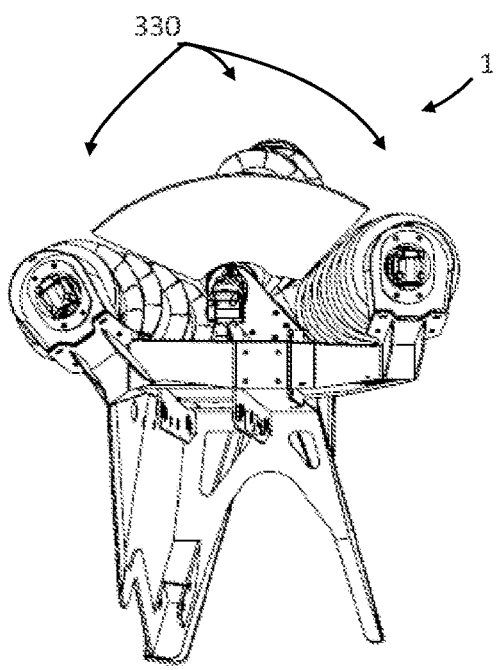
Fig. 5a     Fig. 5b
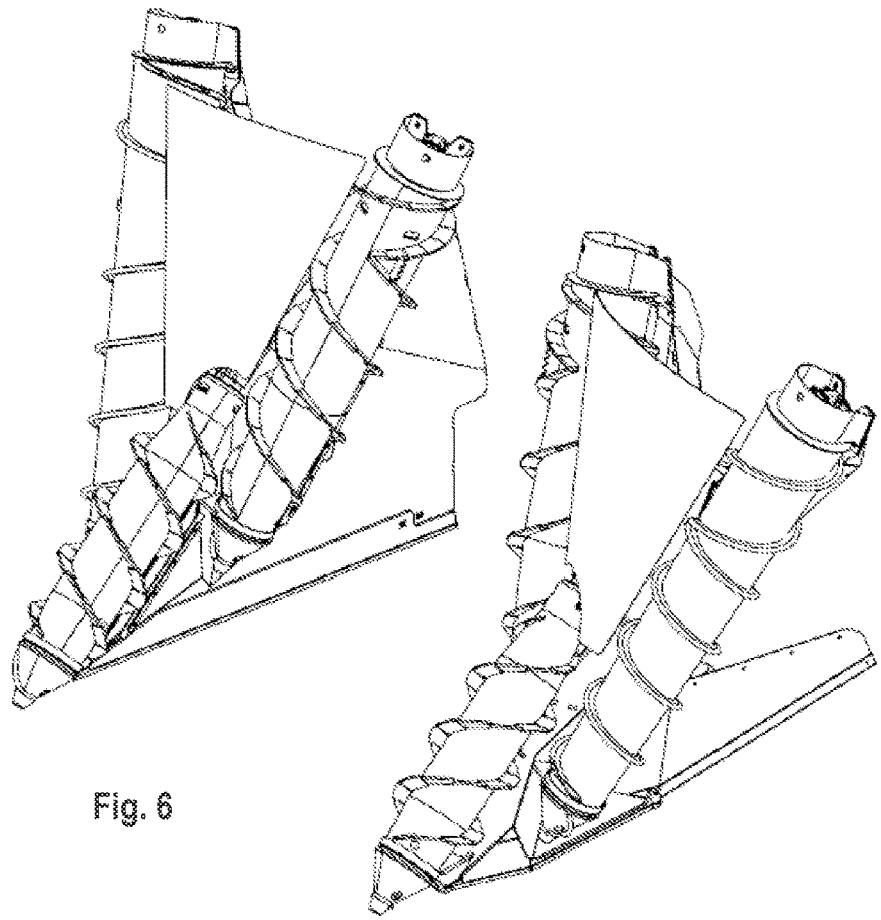
Fig. 6

CANE PICKUP AND SEPARATION AUGERS

CROSS-REFERENCE TO RELATED APPLICATIONS

This application is a national phase entry under 35 U.S.C. § 371 of International Patent Application PCT/AU2019/000070, filed Jun. 3, 2019, designating the United States of America and published as International Patent Publication WO 2019/227125 A1 on Dec. 5, 2019, which claims the benefit under Article 8 of the Patent Cooperation Treaty to Australian Patent Application Serial No. 2018901966, filed Jun. 1, 2018.

TECHNICAL FIELD

This application relates to a harvester accessory. More particularly, this disclosure relates to a cane harvester accessory. Still more particularly, this disclosure relates to a cane pickup and sorting or separation device.

BACKGROUND

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the process undertaken by the applicant and in the understanding of the disclosure.

Cane crop pickup and separation devices have been described having a pair of augers, also known as spirals. The auger tips are positioned slightly above ground level and diverge upwardly and a rearwardly inclined angle. As the augers rotate, helical flights guide the cane trapped between the auger tips spirally up into a widening gap between the rearwardly, inclined, upwardly diverging augers, where the cane is separated and fed rearwardly. A broad spill tray forming part of a mounting frame extends between the augers and guides the separated cane into a feeder zone for cutting and billeting. The augers may be inclined at a smaller angle to the horizontal to facilitate pickup from the ground. Or the augers may be inclined at a larger angle to the horizontal to facilitate separation. Normally the augers are set at an angle of about 45°-60° to ensure reasonable separation of cane once picked up. However, this compromise equates to a significant limitation on the proportion of cane that is picked up by the prior art devices.

BRIEF SUMMARY

The disclosure according to one or more aspects is as defined in the independent claims. Some optional and/or preferred features of the disclosure are defined in the dependent claims.

Accordingly, in one aspect of the disclosure, there is provided:

A harvest pickup and separation device mountable to a vehicle and including a vegetation separation device set at a steep inclination of between 50° and 75° to the horizontal, wherein the vegetation pickup and separation device further includes: a vegetation pickup device set at a lower inclination of between 20° and 50° to the horizontal and having a leading member adapted to lift harvest material off the ground and to urge it towards the vegetation separation device to draw or push the harvest material into a separation zone above the leading member.

The pickup device may be driven by a pickup drive means. The pickup drive means may be independent of a separation drive means of the separation device. The pickup and separation drive means may be powered by a common source, such as a power take off (PTO) or other motorized energy generator.

The pickup device may be set forward of the separation device. The pickup device may be substantially cigar or torpedo shaped. The pickup device may have a shaft that is thicker intermediate its length and tapering at one or both ends. The pickup device may be tapered towards the leading member. The shaft of the pickup device may be substantially conical in shape, thickening towards an upper portion of the shaft. However, preferably the shaft of the pickup device has a substantially consistent cross-sectional diameter throughout its length. The pickup device may be in the form of a spiral.

The leading member may be spoon-, scoop- or shovel-shaped. The leading member is preferably in the form of a nose. The nose may have a substantially pointed tip.

Preferably, the nose is substantially conically shaped with the substantially pointed tip extending downward at an inclined angle to the horizontal. The nose may have a conical-shaped body. The pointed tip may be continuous with the conical-shaped body of the nose. The leading member may be static or non-driven. The leading member may be rotatable. The leading member may be rotatable about a rotational axis of the pickup shaft of the pickup device. The leading member is preferably rotatably driven. The leading member is preferably rotatably driven together with the pickup shaft.

The separation device may include two or more augers. The separation device may include a pair of augers. The augers may be described as sorting augers. The sorting augers may be angled relative to each other in a V-shape. The sorting augers may include lower members at their respective lower ends. The lower members may be oriented close to each other at a pickup zone and their respective auger shafts may diverge upwardly and rearwardly.

The contact between the harvest material and the harvest accessory forms a material interaction point. The material interaction point may include one or members, including the leading member and/or one or more sorting augers. Preferably, the material contact point includes three members forming a three point contact. The material interaction point may include the pick and/or sorting devices, or other live or static devices.

The sorting augers may together with the leading member form a leading three member contact with the harvest material. The lower portions of the sorting augers may together with the leading member form the three member contact with the harvest material. The three member contact may comprise the pickup spiral and the sorting augers. The three member contact may first make contact with the harvest material at the pickup zone. The three member combination of the pickup spiral and sorting augers may be configured to maintain contact with the harvest material through the transition zone and into the separation zone. The three member contact may combine to create a bend radius around the three member contact. The bend radius may vary between 200 mm-1000 mm. The bend radius may change as the harvest material rides up the rotating spiral and augers. In the case of cane, the stalks may generally wrap around the front of the three member combination in a bend radius that varies between 200 mm-1000 mm.

In a transition between the pickup zone and the separation zone, the upper rear side of the spiral and the inward front sides of the sorting augers facing the pickup spiral, together form a transition zone pushing or urging the pre-sorted harvest material into a separation zone. The separation zone may be located above the upper end of the pickup spiral. The three point contact is preferably located in the transition zone. The three member contact of the pickup spiral, and first and second sorting augers, may continue into the separation zone. The harvest material may be picked up at ground level and carried upwardly and rearwardly as a collective between the three members into the separation zone.

The pickup and separation device may be mountable to a vehicle. The pickup and separation device may include the plurality of augers. The separation device may include the pair of augers. The augers may be equipped with auger tips. The auger tips may be adapted to be positioned slightly above ground level. The pair of augers may diverge relative to one another. The lower portions of the pair of augers may be inclined upwardly. The pair of augers may extend rearwardly at an inclined angle to the horizontal to define a diverging gap.

The upwardly and rearwardly inclined separation wall may be located rearward of the sorting augers and may extend substantially across the diverging gap. The frame is mountable to the vehicle and is preferably adapted to support the one or more sorting augers and the separation wall. The pickup spiral may be adapted to be inclined at a shallower angle to the horizontal than the inclined angle of the augers. In particular, the pickup spiral is preferably set at a shallower inclination to the horizontal than the steeply inclined angle of the sorting device. Still more particularly, the pickup spiral is preferably set at a shallower inclination compared to the rotational axes of the one or more sorting augers.

The separation and pickup device spiral may be mountable to an auger frame. The auger frame may in turn be mountable to a vehicle. The vehicle may be a harvester. The frame may be adapted to support the one sorting augers. The sorting augers may include auger tips that are adapted to be positioned a pre-set approximate height above ground level. The sorting augers preferably diverge relative to one another and are inclined upwardly and rearwardly at an inclined angle to the horizontal to define a diverging gap. Upwardly and rearwardly extending is the inclined separation wall.

The separation wall may be located rearward of the pair of augers and extending between the diverging gap.

The vegetation may be cane. The pickup and separation device may be mountable to a cane harvester. The device may include the pair of sorting augers with auger tips that are adapted to be positioned a pre-set approximate height above ground level, the augers diverging relative to one another and inclined upwardly and rearwardly at an inclined angle to the horizontal to define the upwardly diverging gap. The cane pickup and separation device may further include the separation backing wall that is upwardly and rearwardly inclined. The separation wall is preferably located rearward of the pair of augers, extending substantially across the diverging gap to define, with the sorting augers, the sorting zone. The frame may be mountable to a front end of the cane harvester and adapted to support the pair of augers and the separation wall. The device may further include the at least one pickup spiral that is set at a shallower inclination to the horizontal than the steeply inclined angle.

The frame is advantageously adapted to be mounted to the front end of a mobile agricultural vehicle. The frame may include a lower left mount adapted to support a rotatable left side sorting auger and an upper left side support for holding an upper portion of the left side sorting auger. A left intermediate region may be located between the lower left mount and the upper left support, the left intermediate region may extend through a left longitudinal axis and may define a left side of the sorting zone. The frame may further include a lower right side mount adapted to support a rotatable right side sorting auger and an upper right side support for holding an upper portion of the right side sorting auger. A right intermediate region may be located between the lower right mount and the upper right support and may extend through a right longitudinal axis to define a right side of the sorting zone. The separation wall may extend behind the left and right intermediate regions. The frame may further includes a central lower mount to support a rotatable pickup spiral and an upper support for holding an upper portion of the pickup spiral. The central lower mount and the upper support are preferably adapted to orient the pickup spiral at a shallower inclination to the horizontal than the inclination of the left and right longitudinal axes.

A first one of the sorting augers may be set at a first steep inclination angle and a second one of the sorting augers may be set at a second a steep inclination angle. The first and second steep inclination angle may be the substantially the same, only a few degrees of inclination different, or may be significantly different, whilst still distinctly steeper to the horizontal than the inclination of the pickup or leading spiral. The steep inclination of the two sorting augers may therefore be substantially the same.

The vegetation pickup device and the vegetation separation device may each have lower portions. The lower portions may combine to form the lower pickup zone. The lower portions of each of the vegetation pickup device and the vegetation separation device may include a lower tip. The lower portions may define the pickup zone.

The vegetation pickup device and the vegetation separation device may combine to form the transition zone. The transition zone may be adapted to move harvest material from the pickup zone to the separation zone.

The vegetation pickup and vegetation separation devices may be adapted to combine to provide at least three points of contact of a mass of the harvest material moving through the transition zone. The harvest pickup and separation device may be adapted to maintain the at least three points of contact through the pickup and transition zones.

The transition zone may include a bend. The bend may have a radius that maintains the at least three points of contact on the mass of harvest material.

The bend may be a space, passage, corridor or channel that is defined as an area or zone between the augers forming the vegetation pickup and separation devices.

The bend defined between the vegetation pickup and separation devices may include a static device. The static device may include a convex cover between the sorting augers. The static device may be the separation wall.

Vehicle and Frame

The vehicle may be an agricultural machine, such as a harvester. The harvester may be a cane harvester, forage harvester, row crop harvester or corn harvester. The vehicle is adapted to receive a frame mountable to its front end to support the cane pickup and separation device.

The frame may be cantilevered off the front of the vehicle. The frame may be height adjustable. The frame may be suspended above the ground and may have a ground contour sensing mechanism responsive to the contours of the ground.

The frame may include rollers, wheels or skids on its underside. The ground contour sensing mechanism may include a spring and/or damper mechanism that immediately adjusts the height of the frame to the immediate contours of the approaching ground.

The supports and mounts may rotatably support their respective augers or spirals. The supports or mounts may rotatably support the augers or spirals. Preferably, the lower mount permits rotation of the respective auger or spiral shaft. The mount may include a bearing collar adapted to support the respective shaft for rotation.

Pickup and Separation Device

The pickup and separation device may be suitably used for collecting and separating vegetation pre-stripped or cut from its plant or form the soil, or as part of the process of removing the vegetation from the plant or soil. Preferably, the vegetation is cane and the pickup and separation device is used for collecting and separating cane crops preparatory to cutting or billeting of the sugar cane. The pickup and separation device may include augers with spirals. The spirals may be constant or variable in pitch. The spirals may be progressive or regressive. The spirals may be have one or more starts. The spirals preferably have two starts.

The pickup spiral device may rotate in the same direction as the pair of augers.

However, advantageously the pickup spiral rotates in the same direction as one or other of the augers to urge harvest material from the pickup zone to the transition zone. The pickup device advantageously rotates in the same direction as one or other of the augers to urge harvest material from the transition zone to the separation zone.

Separation or Sorting Augers

Each auger of each pair of separation or sorting augers is rotatable about divergent axes. The augers may be arranged in pairs. The direction of rotation of the augers of each pair is preferably opposed. The opposed rotation of the augers preferably draws harvest material up from the pickup zone into the transition zone. The opposed rotation of the augers urges the harvest material to ride up through the transition zone between the augers. The pickup spiral device advantageously rotates in the same direction as one or other of the augers to urge harvest material from the pickup zone to the transition zone. The pickup device advantageously rotates in the same direction as one or other of the augers to urge harvest material from the transition zone to the separation zone.

Each separation auger includes a tapering shaft bearing a lower helical flight spiraling in a first direction and an upper helical flight spiraling in a second direction opposed to the first. Accordingly, when rotated, the shaft tends to urge crop material upwardly along the shaft until it reaches an intermediate section of the shaft. The opposed upper spirals then urge the crop material to concentrate in the intermediate region. The collecting of crop material adjacent the intermediate section allows it to be fed to the sorting zone.

Each auger may be collectively or separately driven. The drive means may be any suitable motor. The motor may be driven by a PTO. The motor may be hydraulic.

Each auger preferably is driven by a separate motor. The rotational speed of each separation auger may be individually set. The rotational speed of each separation auger may be matched to the speed of the vehicle. The rotational speed of each separation auger may be proportional to the speed of forward travel of the vehicle.

The angle of inclination of the sorting augers may be between 40°-75° or 50°-65°, more preferably 50°-65°, and most preferably about 60°. The sorting augers may be set at the same inclination or may differ from each other. The sorting augers may include an outermost and an innermost auger. The outermost sorting auger may have a steeper angle than the innermost auger of the augers mounted.

Separation Wall, Sorting Zone and Diverging Gap

The separation wall may be a curved panel or tray. The wall may be made from a single sheet. The wall may be made from multiple panels joined together. The wall may be made from a single metal sheet or multiple sheets welded together. The wall may be made from a molded panel made of polymeric material.

The wall may be substantially concave to define a shallow channel corresponding to the sorting zone. Separated crop may collect and concentrate at the sorting zone.

As the crop material is effectively sifted by the combined work of the separation augers, desired cane material is generally retained and smaller particles of dirt, grit and relative rubbish is generally permitted to drop to the ground.

The separation augers include a lower tip that is either static or forms part of the shaft and is therefore rotated therewith.

Pickup Spiral

The pickup spiral may rotate in a set direction about its longitudinal axis.

The angle of inclination of the pickup spiral may be between 25°-50°, and more preferably 30°-45°, and most preferably about 40°.

The pickup spiral may be substantially shorter in length relative to the separation augers.

The pickup spiral may be adapted to be driven by a separate motor. The motor may be optionally powered by a common power take off (PTO) source. The spiral may turn at a rotational speed matched to the harvester's ground speed.

BRIEF DESCRIPTION OF THE DRAWINGS

The disclosure may be better understood from the following non-limiting description of preferred embodiments, in which:

FIG. 1c is a front view of the right-hand set shown in FIG. 1b;

FIG. 1d is a side elevation of the a left-hand side set of augers of the device shown in FIG. 1;

FIG. 1e is a side elevation right-hand set of augers shown in FIGS. 1b and 1c;

FIG. 5a is a top plan view of a right hand side cane pickup and separation device similar to that shown in FIG. 1; and FIG. 5b is a top plan view of a left hand side cane pickup and separation device similar to that shown in FIG. 1.

FIG. 6 is an isometric view of the right and left hand side cane pickup and separation devices respectively shown in FIGS. 5a and 5b.

FIG. 7b is a front view of the right hand set shown in FIG. 7a; and FIG. 7c is a side elevation of the left hand side set of augers of the device shown in FIG. 6, being a mirror image of the device shown in FIG. 7a.

DETAILED DESCRIPTION

Preferred features of this disclosure will now be described with particular reference to the accompanying drawings. However, it is to be understood that the features illustrated in and described with reference to the drawings are not to be construed as limiting on the scope of the disclosure.

Figure 1:
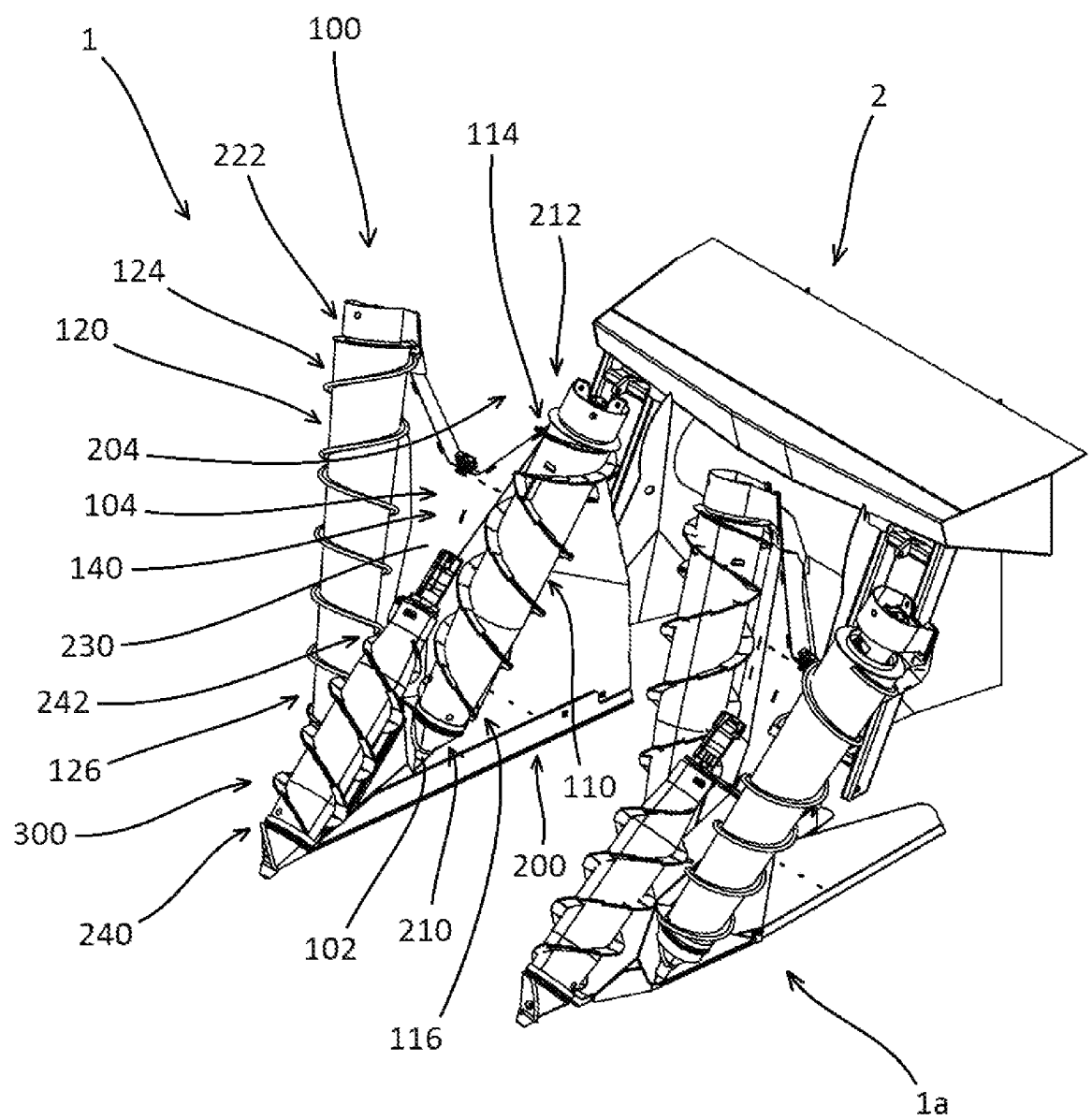
FIG. 1 is a perspective view of a cane pickup and separation device according to the disclosure.
Figure 2:
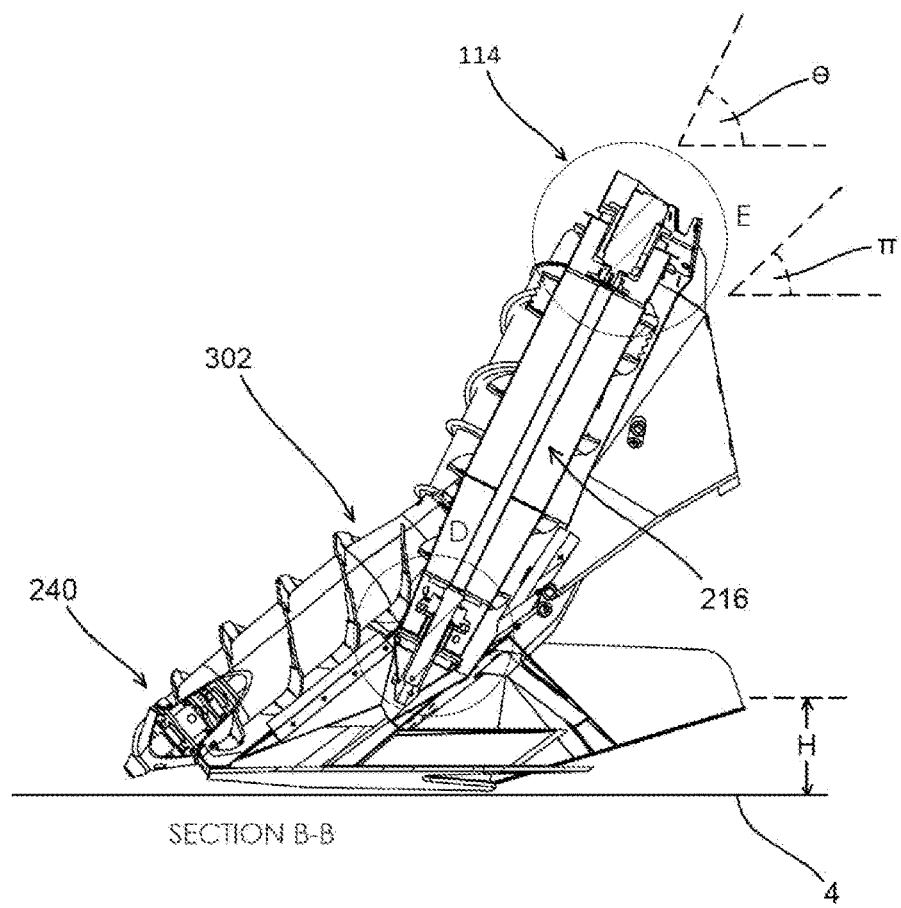
FIG. 2 is a side section B-B from FIG. 2e of the cane pickup and separation device shown in FIG. 1.
Figure 3:
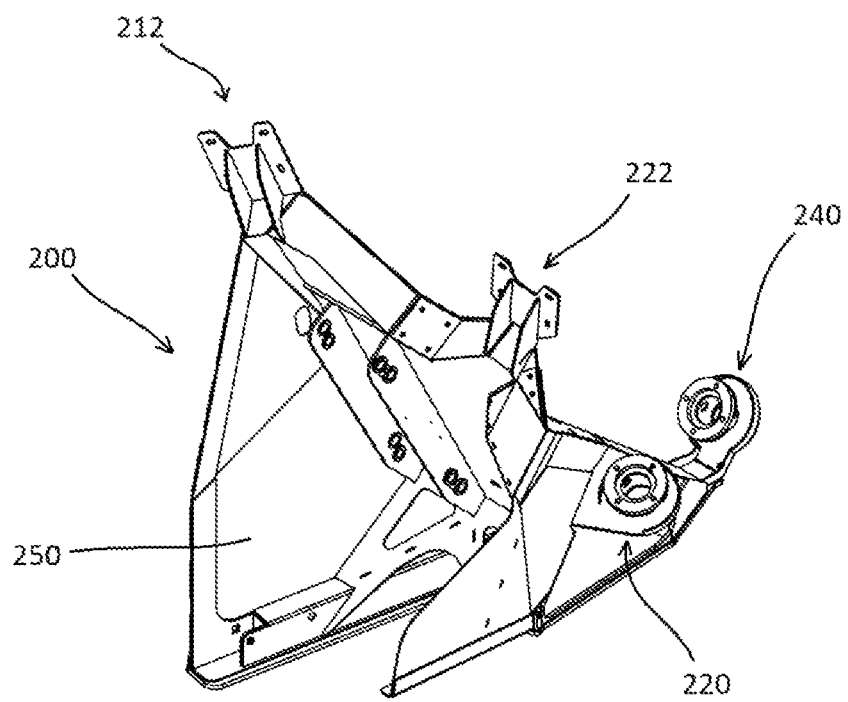
FIG. 3 is a front view of a frame for the cane pickup and separation device shown in FIG. 1.
Figure 3A:
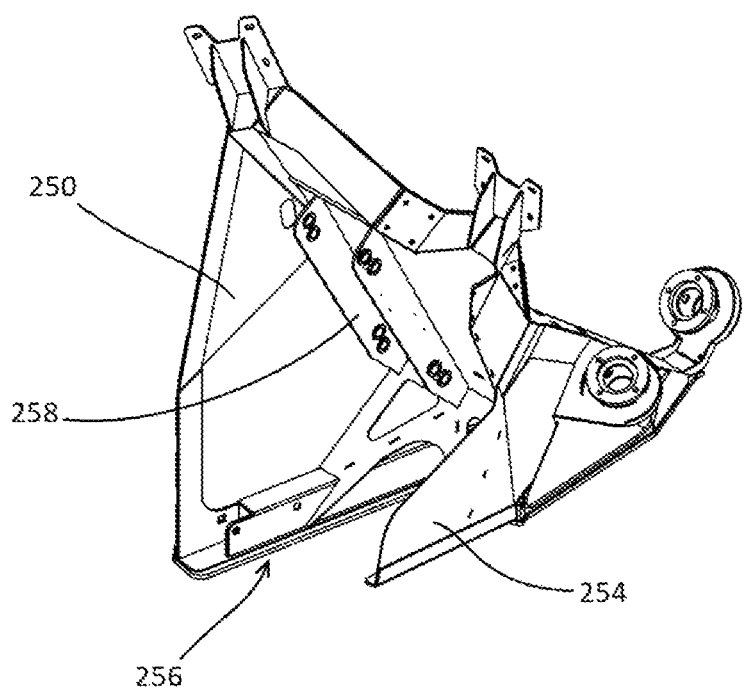
FIG. 3a is a rear asymmetric view of the frame shown in FIG. 3.
Figure 3B:
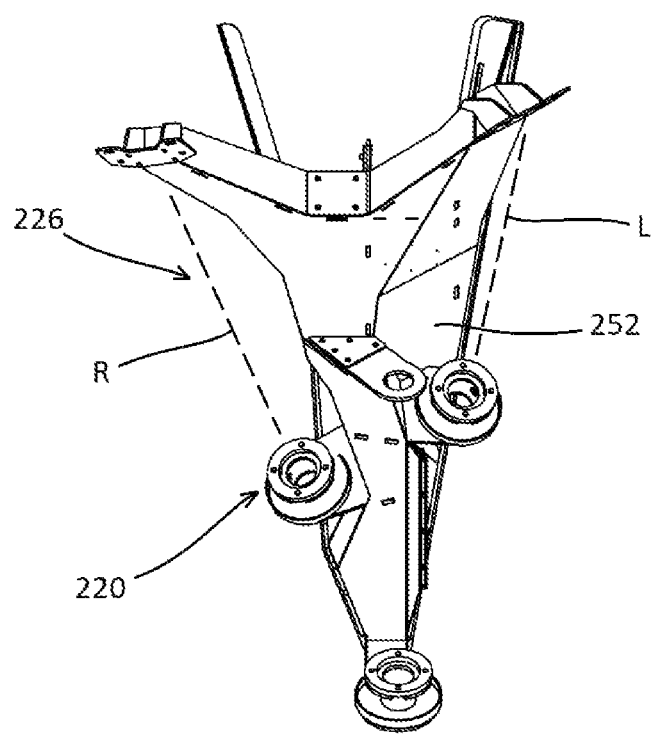
FIG. 3b is a front elevation view of the frame shown in FIG. 3.
Figure 3C:
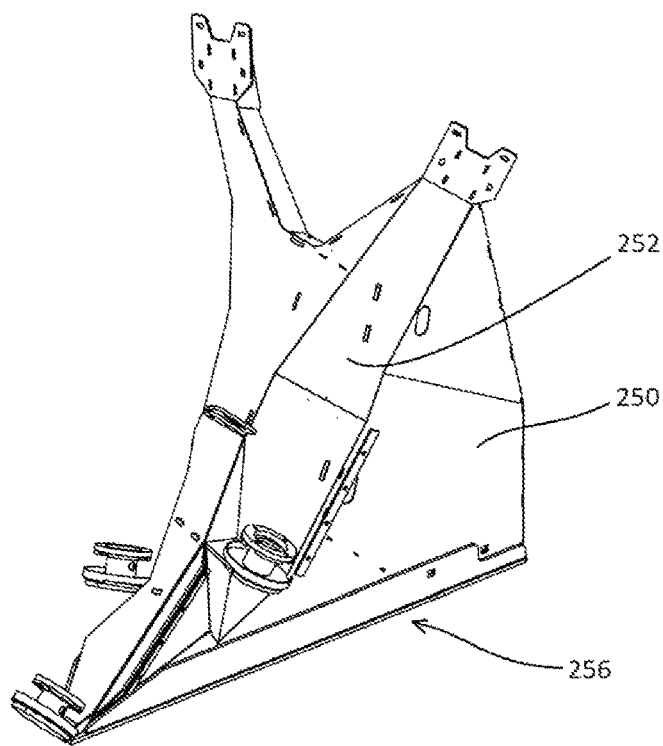
FIG. 3c is a right front asymmetric view of the frame shown in FIG. 3.
Figure 3D:
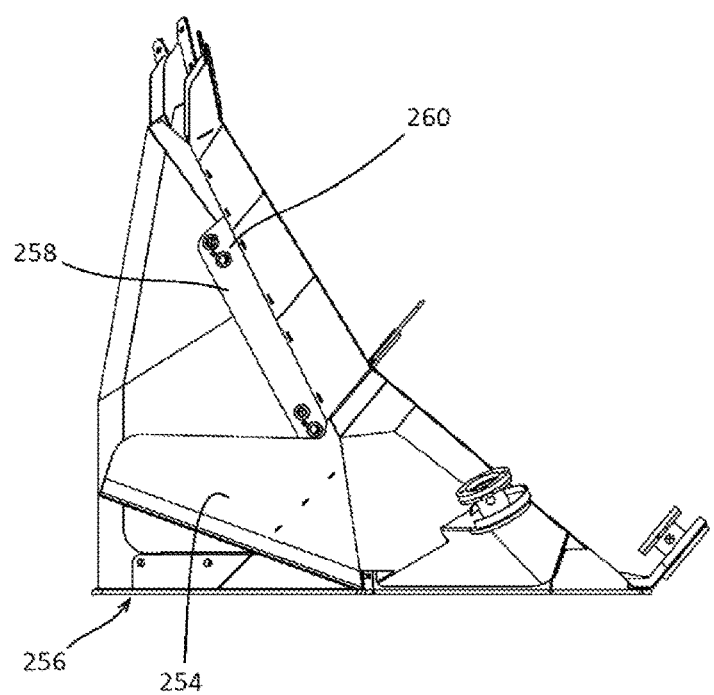
FIG. 3d is a same side elevation of the right-hand side frame shown in FIG. 3.
Figure 3E:
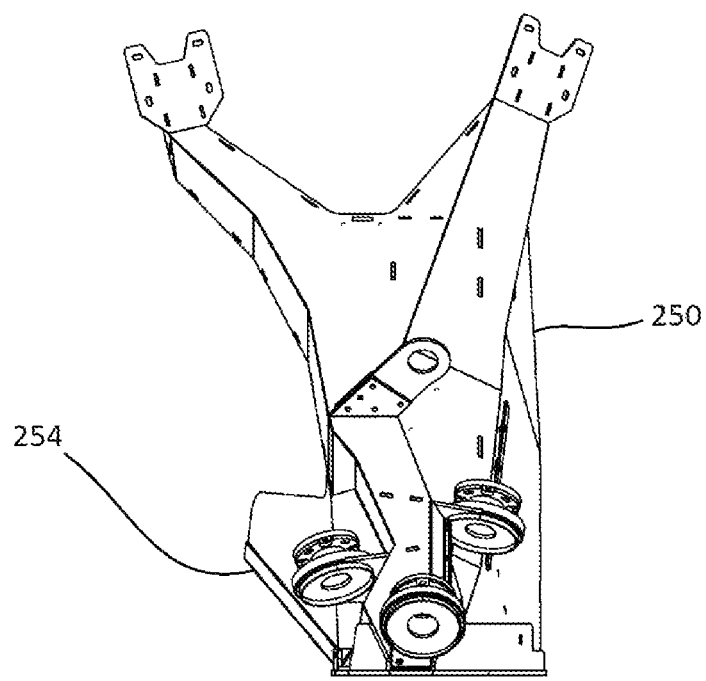
FIG. 3e is a similar front elevation of the frame shown in FIG. 3.
Figure 3F:
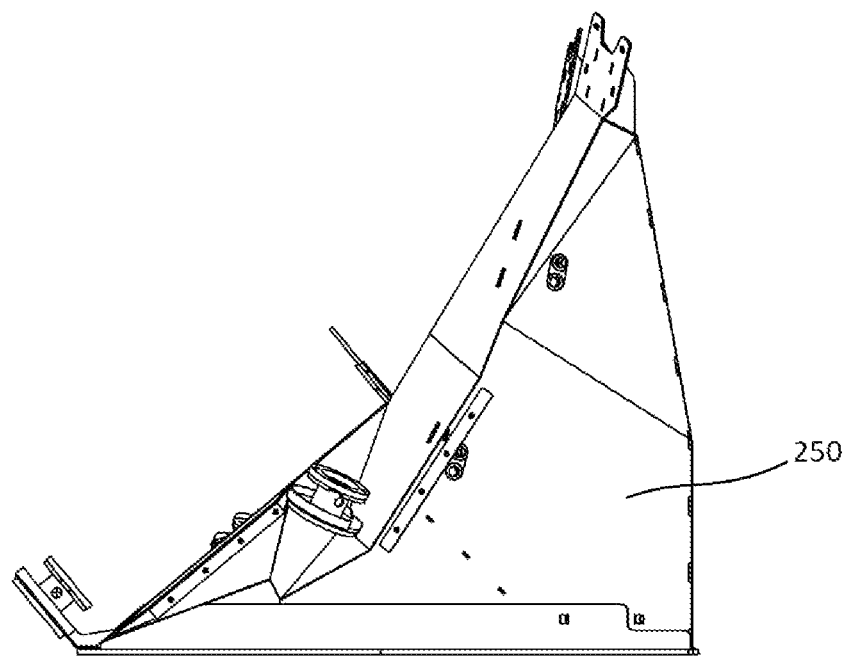
FIG. 3f is a left-hand side elevation of the right-hand side frame shown in FIG. 3.

In FIGS. 1-3, there is shown a cane pickup and separation device 1 mountable to a vehicle, the front of which is depicted in FIG. 1 and identified by reference No. 2. The device 1 includes at least two sorting augers 100 with auger tips 102, a frame 200, a separation wall 230, and a pickup spiral 300.

The sorting augers 100 each have auger tips 102 that are adapted to be positioned slightly above ground level 4. The sorting augers 100 diverge relative to one another and are inclined upwardly and rearwardly at similar inclined angles 0 to the horizontal to define a diverging gap 104. Behind the augers 100 is the upwardly and rearwardly inclined separation wall 230. The separation wall 230 is rearward of the pair of augers 100 and extends substantially across the diverging gap 104. The frame 200 is mountable to the vehicle 2 and is adapted to support the pair of sorting augers 100 and the separation wall 230. The device 1 further includes at least one pickup spiral 300 set at a shallower angle p inclination to the horizontal than the steeply inclined angle θ.

The cane pickup spiral 300 is mountable to the auger frame 200, which is in turn mountable to the vehicle 2, which is in the form of a cane harvester. The frame 200 is adapted to support the pair of augers 100 with the lowermost of the auger tips 102 being positioned a pre-set approximate height at or slightly below ground level 4. The frame 200 includes the separation wall 230 that is generally Y-shaped to define a pathway 204 for a rearwardly extending chute (not shown).

The upwardly and rearwardly inclined separation backing wall 230 is located rearward of the pair of augers 100 and extends substantially across the diverging gap 104 to define, with the sorting augers 100, a sorting zone 140 in the diverging gap 104.

Figure 1A:
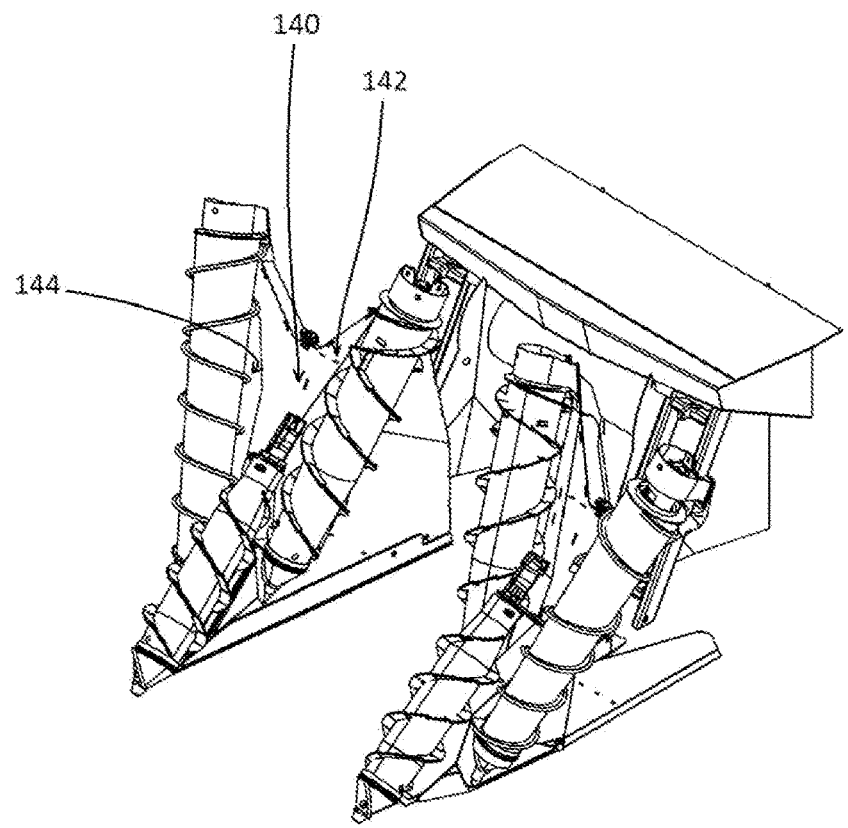
FIG. 1a is a similar front perspective view of the device shown in FIG. 1.
Figure 1B:
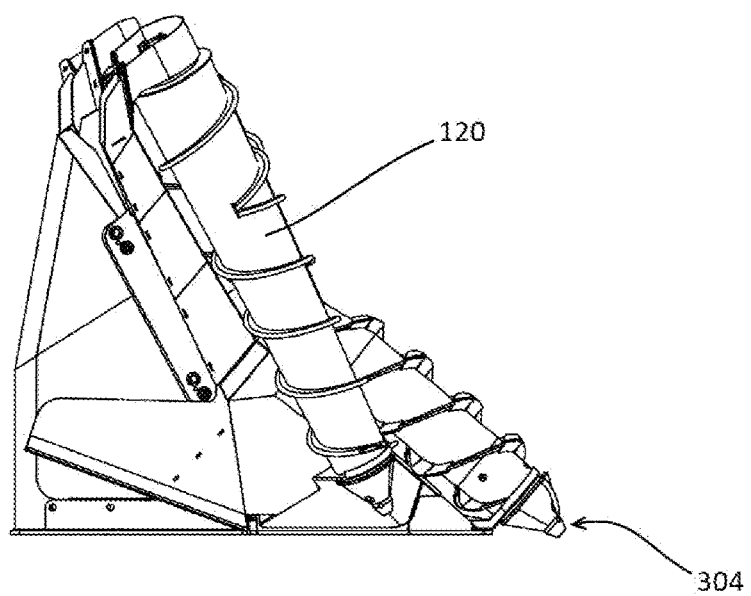
FIG. 1b is a side elevation of a right-hand side set of augers of the device shown in FIG. 1.

The frame 200 is adapted to be mounted to the front end of a mobile agricultural vehicle 2. The frame 200 includes:
- a lower left mount 210 adapted to support a rotatable left side sorting auger 110;
- an fixed left side upper support 212 for holding an upper portion 114 of the left side sorting auger 110;
- a left intermediate region 216 between the lower left mount 210 and the left upper support 212 extending through a left longitudinal axis L and defining a left side 142 of the sorting zone 140 (see FIG. 1a);
- a lower right side mount 220 adapted to support a rotatable right side sorting auger 120;
- an fixed right side upper support 222 for holding an upper portion 124 of the right side sorting auger 120;
- a right intermediate region 226 between the lower right side mount 220 and the right upper support 222 extending through a right longitudinal axis R and defining a right side 144 of the sorting zone 140 (see FIG. 1a);
- the separation wall 230 extending behind the left and right intermediate regions 216, 226;
- a central lower mount 240 to support the rotatable pickup spiral 300; and
- a central upper support 242 for holding an upper portion 302 of the pickup spiral 300.

The central lower mount 240 and central upper support 242 are adapted to orient the pickup spiral 300 at a shallower inclination of angle p relative to the horizontal than the left and right longitudinal axes L, R.

The cane pickup and separation device 1 generally will form one of a pair of devices 1, 1a, with device 1a being a mirror image of device 1.

Figure 3G:
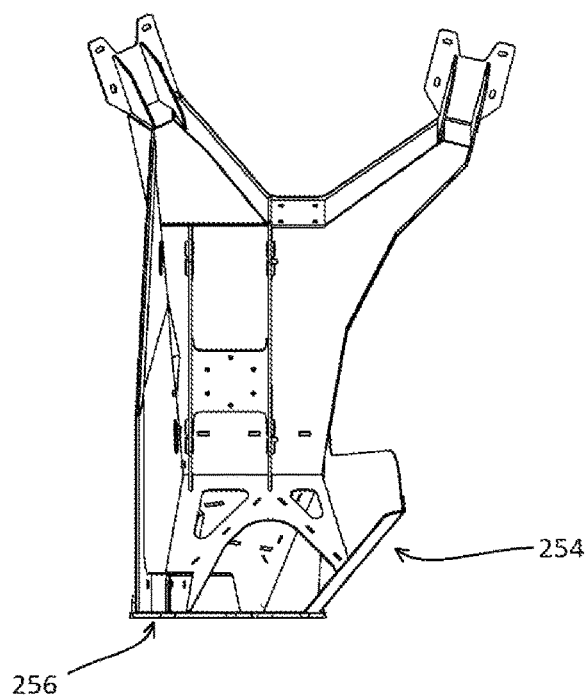
FIG. 3g is a rear elevation of the right-hand side frame shown in FIG. 3.

The frame 200 is shown in detail in FIGS. 3-3g and more broadly in the remaining drawings. The frame 200 includes a broad inner wall 250 made of one or more panels and is in the general shape of a triangle. The broad inner panel is substantially vertically or uprightly aligned with a rear edge that extends substantially vertically from ground level up to the upper support 212. The inner wall 250 has a front edge that joins a transitional corner panel 252 presenting an angular face. The angular corner panel 252 generally following the contours of the left side sorting auger 110 and extends at an angle of about 60-70°. In plan view, the left side sorting auger 110 is adapted to rotate anti-clockwise, whereby smaller debris and rubbish sorted from the sorting zone 140 are dispensed laterally through a gap between the left side sorting auger 110 and the corner panel 252. The rotational motion of the left side sorting auger 110 urges such small material towards the inner wall 250 as it escapes between the left side sorting auger 110 and the angular panel 252.

The separation wall 206 furthermore is shaped to present a gap on its right-hand side edge between the intermediate region 226 of the right side sorting auger 120 to permit debris to be egressed through that gap. Accordingly, larger desirable cane fragments are trapped in the sorting zone 140 as they travel upwardly between the diverging left and right side sorting augers 110, 120.

The corner panel 252 extends substantially along an inside of the left side sorting auger 110 and is joined to the front facing separation wall 230.

The separation wall 206 may be made of a hard-wearing, thick plastic sheeting or solid molded body. A plastic body may be made of HDPE or talc-reinforced polypropylene. Polytetrafluoroethylene (PTFE) or a plastic with a PTFE coating may be used on the separation wall's 206 front surface to minimize friction as cane product travels upwardly along the separation wall 230 surface. The right-hand side of the frame 200 includes a triangular flare panel 254 that has an outwardly inclined face. The bottom horizontal edge of the inner wall 250 may include a skid 256 to present a broad lower surface of the frame 200 to the ground.

A rear mount may include a pair of longitudinally aligned bars 258. The rear mount may include mounting points. The mounting points may comprise up to or about 4 pairs of bolt-mounts 260 for mounting the device 1 onto the front end of the vehicle 2.

The left and right side sorting augers 110, 120 each include a lower set of upwardly rising clockwise flights of corner panel 252 extending from the lower tips 102 up to the upper portions 114, 124 corresponding to the sorting zone 140. Above the sorting zone 140, the direction of the upper set of flights 154 are reverse in orientation, such that anti-clockwise rotation (from a plan view) urges cane produce downwardly toward the sorting zone 140. Therefore the motion of the sorting augers 100 concentrates the cane material towards the sorting zone 140 from either direction. The sorting augers 100 are generally set at a steep angle θ of 60-70 degrees, and preferably about 60°, to facilitate sorting or separation of desired cane produce from undesired debris.

However, the centrally and forwardly located pickup spiral 300 is set at a shallower angle p of about 35-45°, and preferably about 40°, to the horizontal to facilitate efficient pickup of cane produce from the ground level. The pickup spiral auger 300 in use may act as a rooting or scooping mechanism while guiding the collected cane material upwardly between the sorting augers 100 and into the sorting zone 140.

Figure 2A:
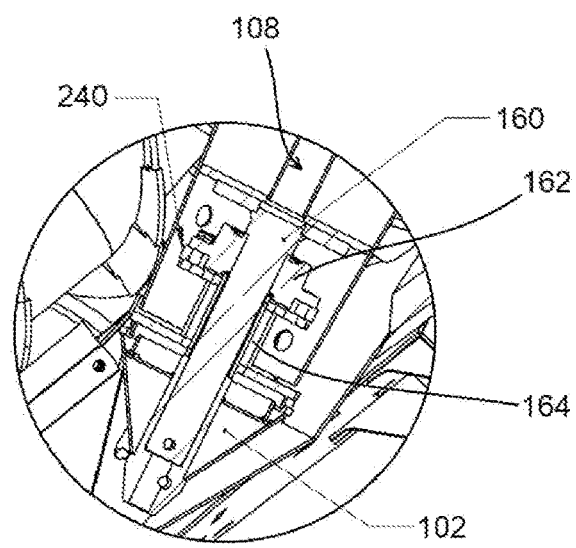
FIG. 2a is a magnified view of the detail D of a lower support of a right side separator auger as depicted in FIG. 2.
Figure 2B:
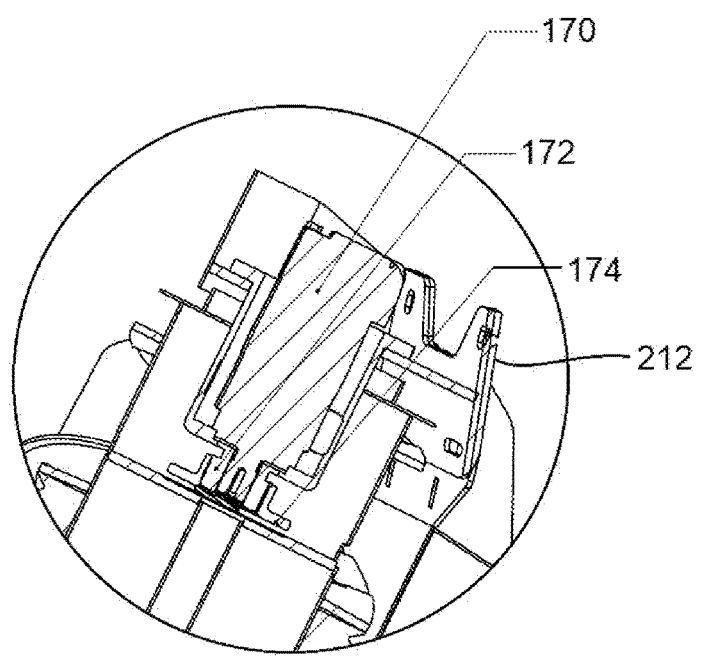
FIG. 2b is a magnified view of the detail E showing an upper mount of the right-hand separation auger shown in FIG. 2.
Figure 2C:
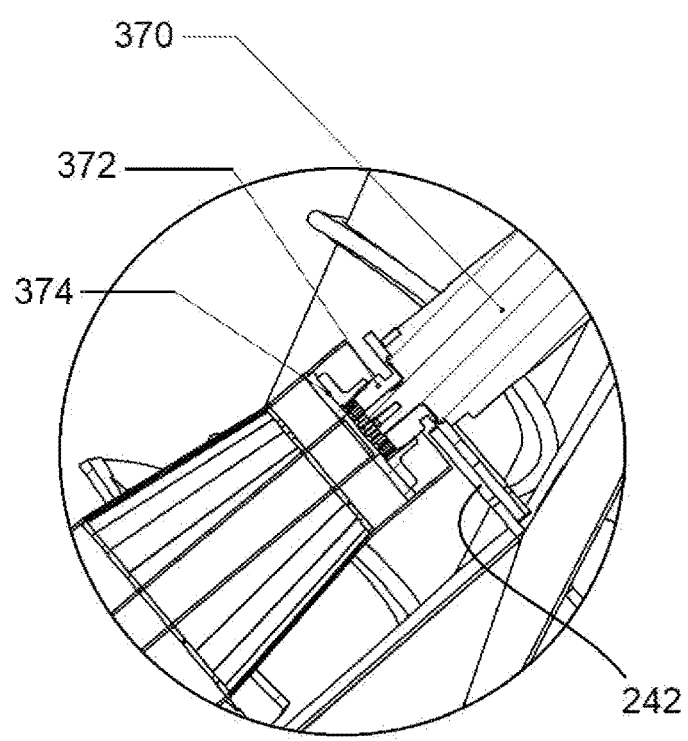
FIG. 2c is a magnified view of the detail G showing an upper support of a pickup auger shown in FIG. 2g.
Figure 2D:
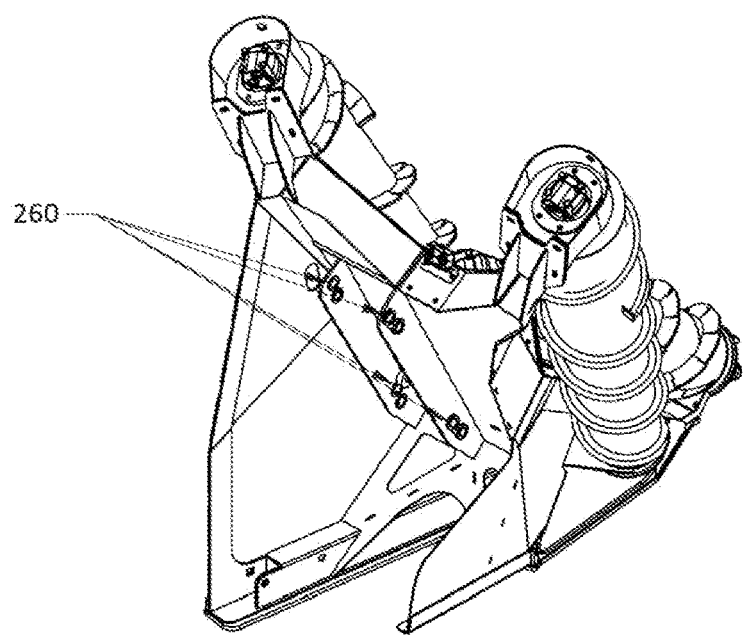
FIG. 2d is a rear perspective view of the frame and augers shown in FIG. 1.
Figure 2E:
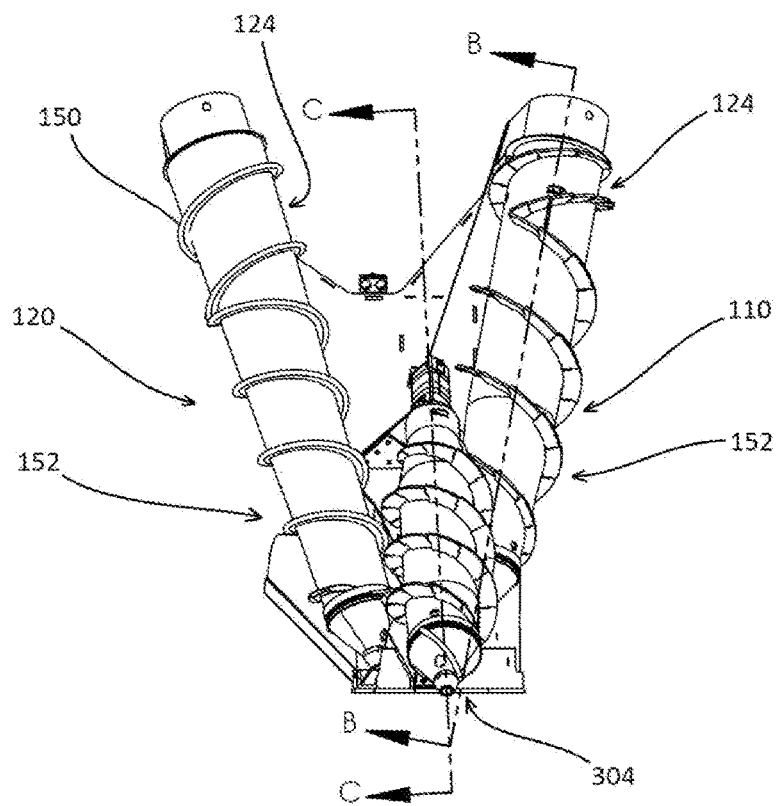
FIG. 2e is a front perspective view of a right-hand side set of augers as shown in FIG. 2d.
Figure 2F:
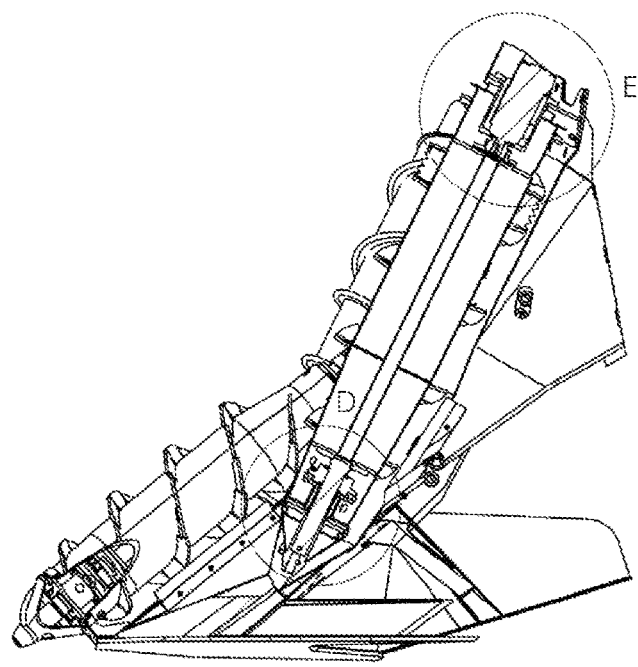
FIG. 2f is a similar section B-B view of the right-hand side set of augers shown in FIG. 2e.
Figure 2G:
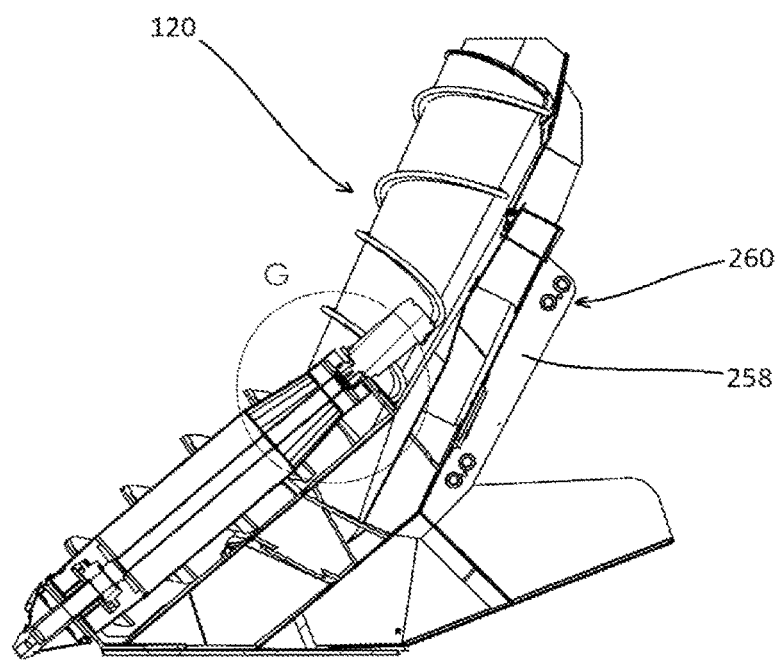
FIG. 2g is a sectional view C-C taken from FIG. 2e.
Figure 2H:
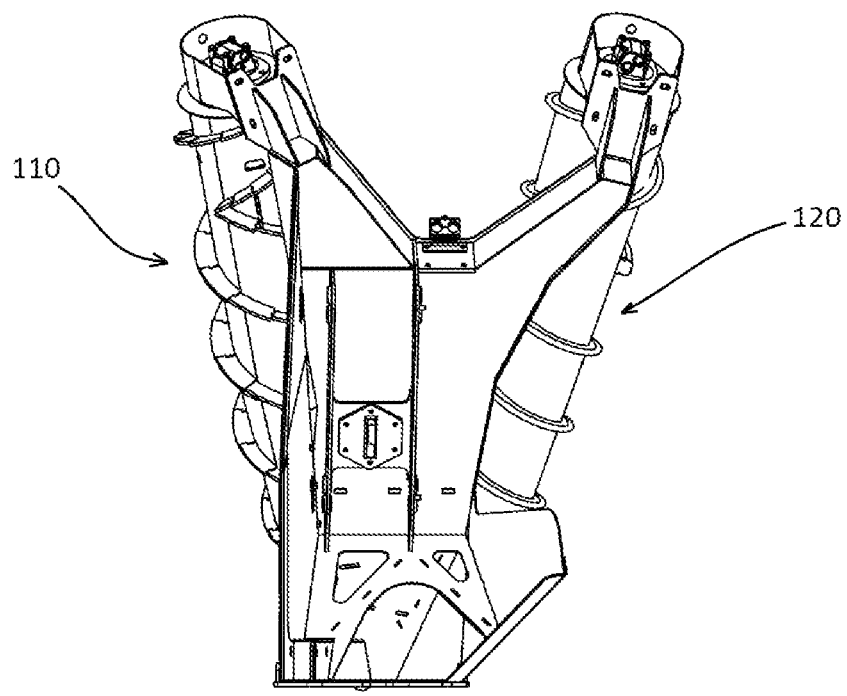
FIG. 2h is a rear elevation of the right-hand side set of augers shown in FIG. 2d.

Referring to FIGS. 2-2h, the lower tip 102 of the sorting augers 100 includes a hard casing, optionally toughened with tungsten-carbide coating for abrasion resistance.

The lower tips 102 may be static or non-driven devices. However, in the example shown, the lower tip 102 is adapted to rotate with the auger shaft 108. Combined with the auger tips 102, the spiral lower tip 304 provides a 3 point ground level contact for pickup of the sugar cane or harvest material 6. Furthermore, the 3-point ground level contact and respective angles of the augers 100 and the pickup spiral 300 provide progressive lift up for the harvest material 6 or cane stalk, which is pre-cut to lie at a so-called knock down angle.

Figure 4A:
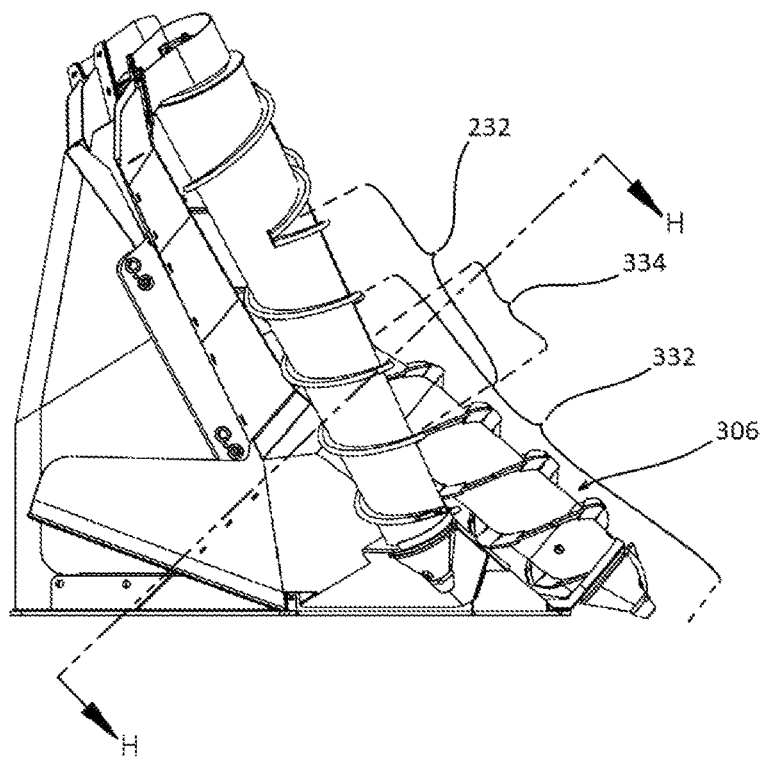
FIG. 4a is a side elevation of the right hand side set of augers of the device as shown in FIG. 1 and similar to FIG. 1b.
Figure 4B:
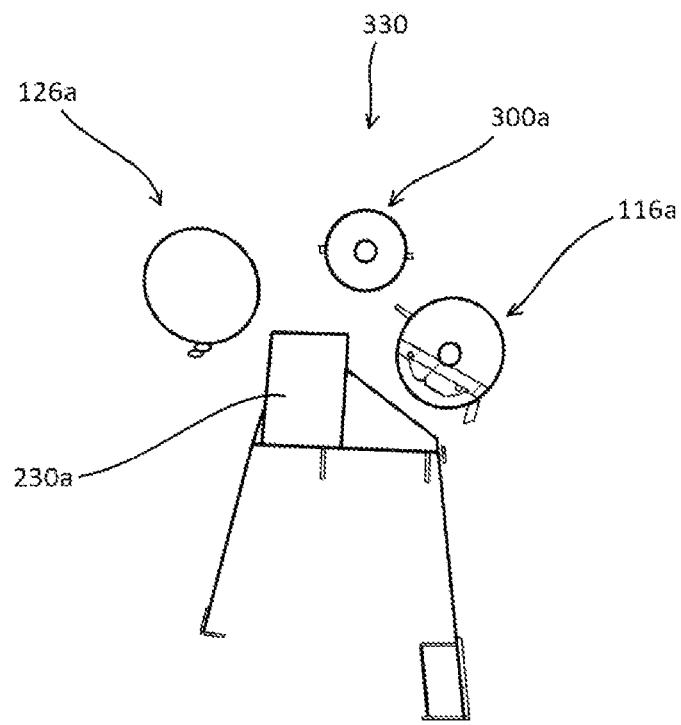
FIG. 4b is a schematic top plan view of a three member contact.
Figure 4C:
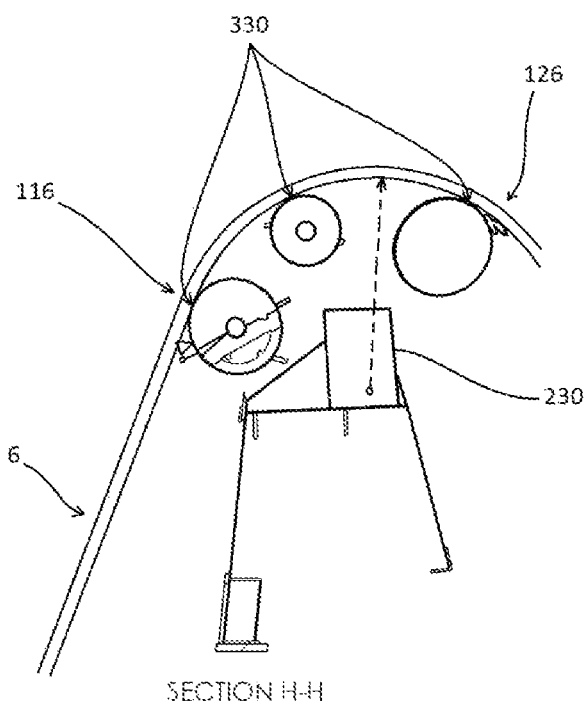
FIG. 4c is a schematic top plan view of the three member contact shown in FIG. 4b showing the positioning of the sugar cane.
Figure 7C:
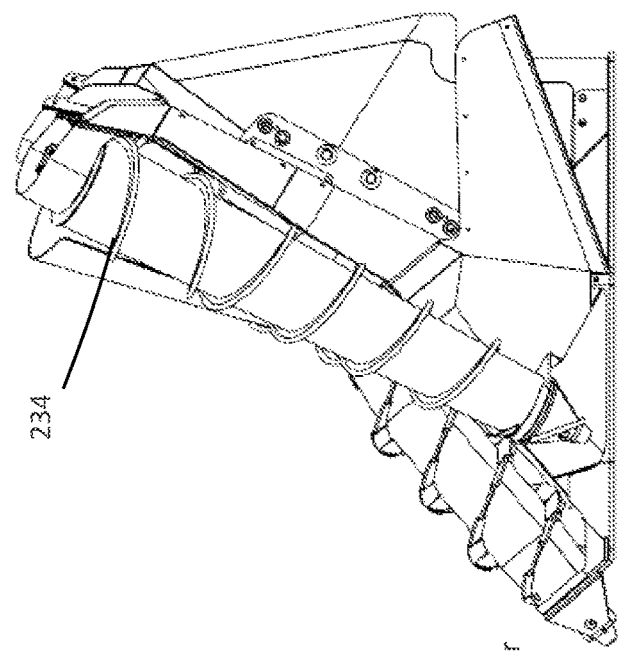
Figure 7B:
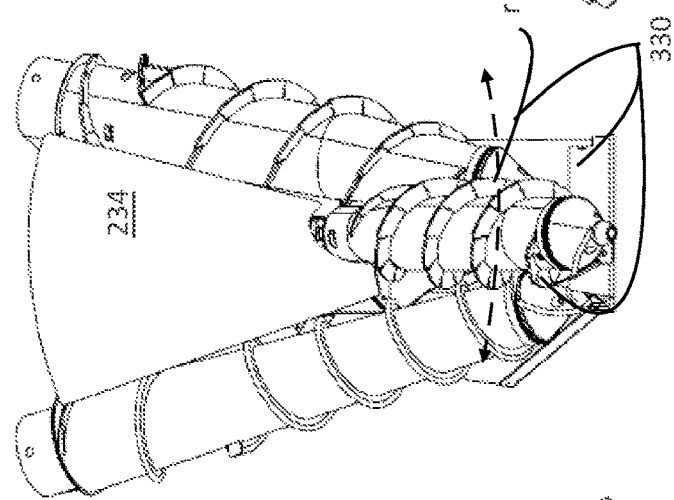
Figure 7A:
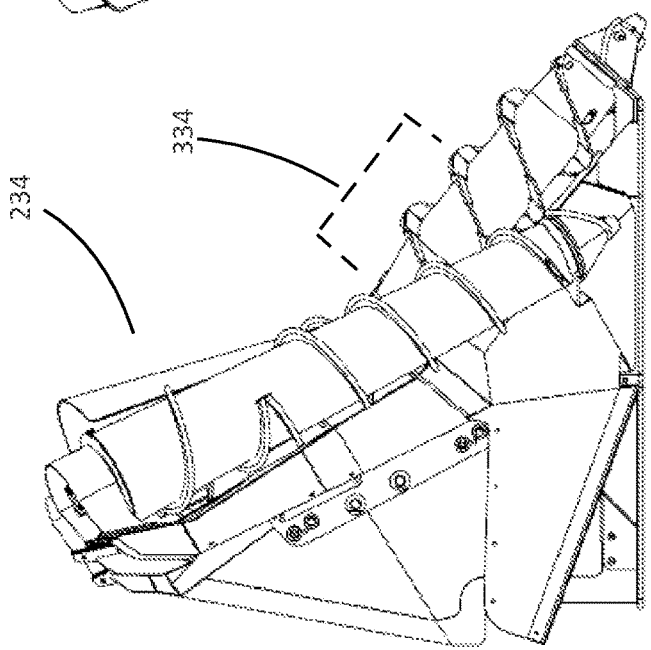
FIG. 7a is a side elevation of the right hand side set of augers of the device similar to that shown in FIG. 4a and showing a convex cover.

Referring to FIGS. 4a-4c, lower portions 116, 126 of the sorting augers 100 may together with the leading member of pickup spiral 300 form a leading three member contact 330 with the harvest material 6. The sorting augers 100 may together with the leading member of pickup spiral 300 form the three member contact 330 with the harvest material 6. The three member contact 330 may comprise the pickup spiral 300 and the sorting augers 100. The three member contact 330 may first make contact with the harvest material 6 at a pickup zone 332. The pickup zone 332 may generally extend between ground level 4 through to the intermediate regions 216, 226. The pickup zone 332 may overlap with the transition zone 334. The three member combination of the pickup spiral 300 and sorting augers 100 may be configured to maintain contact with the harvest material 6 through the transition zone 334 and into the separation zone 232. The three member contact 330 may combine to create a bend radius r around the three member contact 330. The bend radius r may vary between 200 mm-1000 mm. The bend radius r may change as the harvest material 6 rides up the rotating pickup spiral 300 and augers 100. The bend radius may typically increase as the lower portions 116, 126, 306 present a three member contact 330 with a smaller radii than the three member contact at the level of the intermediate regions 216, 226. In the case of sugar cane, the stalks of the harvest material 6 may generally wrap around the front of the three member contact 330 combination in a bend radius r that varies between 200 mm-1000 mm. In the example shown in FIGS. 4a-4c, at the level corresponding to section H-H, the bend radius is about 500 mm.

In the detail D shown in FIG. 2a, the lower tip 102 is shown as rotatable with the shaft 108 and has an idler shaft 160, a bearing 162 and spacer 164 supported on the central lower frame mount 240. In the detail E shown in FIG. 2b, a hydraulic motor 170 is operationally connected to a splined coupling 172 and a splined hub 174, structurally supported and fixed to the frame 200 by the upper support 212.

Similarly, detail G in FIG. 2c shows the drive mechanism of the pickup spiral 300, comprising a corresponding hydraulic motor 370, splined coupling 372 and splined hub 374, all structurally fixed for support to the frame 200 via the upper central support 242.

Referring to FIGS. 5a-7c, the vegetation pickup and separation devices 1, 1a combine to form the transition zone 334. The transition zone 334 is adapted to move harvest material 6 from the pickup zone 332 to the separation zone 232.

The vegetation pickup and separation devices 1, 1a are adapted to combine to provide at least three points of contact 330 of a mass of the harvest material 6 moving through the transition zone 334. The harvest pickup and separation device 1, 1a is adapted to maintain the at least three points of contact 330 through the pickup and transition zones 332, 334.

The transition zone 334 includes a bend with the radius r. The bend radius r maintains the at least three points of contact 330 on the mass of harvest material 6.

The bend is an area or zone between the augers 100, 300 forming the vegetation pickup and separation devices 1, 1a.

The bend defined between the vegetation pickup and separation devices 100, 300 includes a static device. The static device is in the form of a convex cover 234 between the sorting augers 100.

Definitions

The terms "auger" and "spiral" are interchangeable as terms of art, but are used to distinguish in this specification between prior art separation augers (that traditionally are also less effectively used for pickup) and the pickup spiral of one embodiment of this disclosure.

By ground level, it is meant that the lower most ends of each of the spiral and augers is positioned close to and immediately above ground level to effectively get under the general mass of harvest material 6 lying at or near ground level.

Throughout the specification and claims, the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, object terms such as "apparatus," "means," "device" and "member," or similar terms, may refer to singular or plural items and are terms intended to refer to a set of properties, functions or characteristics performed by one or more items or components having one or more parts. It is envisaged that where the object term is described as being a unitary object, then a functionally equivalent object having multiple components is considered to fall within the scope of the object term, and similarly, where the object term is described as having multiple components, a functionally equivalent but unitary object is also considered to fall within the scope of the object term, unless the contrary is expressly stated or the context requires otherwise.

Where the word "for" is used to qualify a use or application of an object term, the word "for" is only limiting in the sense that the device or component should be "suitable for" that use or application.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the spiral tip lowermost and frontmost.

It will be appreciated by those skilled in the art that many modifications and variations may be made to the methods of the disclosure described herein without departing from the spirit and scope of the invention. The features and components of each of the embodiments of the disclosure described in the detailed description and/or depicted in the accompanying drawings may be interchangeable as required, with regard to functional equivalency and compatibility. A feature or component described with reference to one but not all embodiments, if functionally and dimensionally compatible as an addition with another embodiment herein described, or substitutable with a corresponding feature or component of that other embodiment in relation to which it has not been expressly described, should be read as a potential addition or substitution to that other embodiment and as being within the scope of the invention. Furthermore, in considering a feature or component that is described in relation a particular embodiment but may be omitted from the embodiment without losing the functionality characterizing the disclosure and without departing from the scope of the invention, unless the context and expressions used in describing the embodiment imputes that the feature or component is essential to the disclosure as broadly described, the omittable feature or component may be read as not being included in the embodiment.

| Ref. | Description | Ref. | Description |
|---|---|---|---|
| 1, 1a | Device | Ø | Angle of augers |
| 2 | Vehicle | π | Angle of spiral |
| 4 | Ground level | H | Auger tip height |
| 6 | Harvest material | R | Right long axis |
| L | Left long axis | 102 | Auger tips |
| 100 | Sorting augers | 104 | Diverging gap |
|  |  | 108 | shaft |
| 110 | left side sorting auger | 114 | Upper portion of left auger |
|  |  | 116, 116a | Lower portion of left auger |
| 120 | Right side sorting auger | 124 | Upper portion of right auger |
|  |  | 126, 126a | Lower portion of right auger |
| 140 | Sorting zone | 142 | Left side of sorting zone |
|  |  | 144 | Right side of sorting zone |
| 150 | flights | 152 | Lower anti-clockwise flights |
|  |  | 154 | Upper set of flights |
| 160 | Idler shaft | 162 | bearing |
|  |  | 164 | spacer |

| Ref. | Description | Ref. | Description |
|---|---|---|---|
| 170 | Hydraulic motor | 172 | Splined coupling |
|  |  | 174 | Splined hub |
| 200 | Frame | 204 | Pathway for sorted cane |
| 210 | lower left mount | 212 | Upper left side support |
|  |  |  | Left intermediate region |
| 220 | Lower right mount | 222 | Upper right side support |
|  |  | 226 | Right intermediate region |
| 230, 230a | Separation wall | 232 | Separation zone |
|  |  | 234 | Static cover |
| 240 | lower central mount | 242 | Upper central support |
| 250 | Inner panel | 252 | Corner panel |
| 254 | Triangular flare panel | 256 | Skid |
| 260 | Bolt mounts | 258 | longitudinally aligned bars |
| 300 | Pickup spiral | 302 | Upper portion |
| 300a | Lower portion of pick-up spiral | 304 | Lower tip |
|  |  | 306 | Lower portion |
| 330 | Three member contact | 332 | Pickup zone |
|  |  | 334 | Transition zone |
| 370 | hydraulic motor | 372 | Splined coupling |
|  |  | 374 | Splined hub |

The invention claimed is:

1. A harvest pickup and separation device mounted to a vehicle and including a vegetation separation device set at a steep inclination of between 50° and 75° to the horizontal, wherein the harvest pickup and separation device further includes:
a vegetation pickup device set at a lower inclination of between 20° and 50° to the horizontal and having a leading member adapted to lift harvest material off the ground and to urge it towards the vegetation separation device to draw or push the harvest material into a separation zone above the leading member, wherein:
the vegetation pickup device further includes a pickup spiral;
the separation device includes two or more sorting augers;
the pickup spiral and two or more sorting augers are collectively adapted to make first contact with the harvest material at a pickup zone;
in a transition between the pickup zone and the separation zone, a transition zone is adapted to move the harvest material from the pickup zone to the separation zone; and
each of the pickup spiral and the two or more sorting augers of the separation device maintain contact with the collective harvest material through the transition zone.

2. The harvest pickup and separation device according to claim 1, wherein the vegetation separation device includes two sorting augers.

3. The harvest pickup and separation device according to claim 2, wherein a first one of the two sorting augers is set at a first steep inclination angle and a second one of the two sorting augers is set at a second steep inclination angle different to the first steep inclination angle.

4. The harvest pickup and separation device according to claim 2, wherein the first and second steep inclination angles of the two sorting augers is substantially the same.

5. The harvest pickup and separation device according to claim 1, wherein the vegetation pickup device and the vegetation separation device each have lower portions and the lower portions combine to form the pickup zone.

6. The harvest pickup and separation device according to claim 5, wherein the lower portions of each of the vegetation pickup device and the vegetation separation device is a lower tip.

7. The harvest pickup and separation device according to claim 5, wherein the lower portions define the pickup zone.

8. The harvest pickup and separation device according to claim 7, wherein the vegetation pickup and vegetation separation devices are adapted to combine to provide at least three points of contact of a mass of the harvest material moving through the transition zone.

9. The harvest pickup and separation device according to claim 8, adapted to maintain the at least three points of contact through the pickup and transition zones.

10. The harvest pickup and separation device according to claim 9, wherein the transition zone includes a bend.

11. The harvest pickup and separation device according to claim 10, wherein the bend has a radius that maintains the at least three points of contact on the mass of the harvest material.

12. The harvest pickup and separation device according to claim 10, wherein the bend is defined between augers forming the vegetation pickup and separation devices.

13. The harvest pickup and separation device according to claim 10, wherein the bend is defined between the vegetation pickup and separation devices and includes a static device.

14. The harvest pickup and separation device according to claim 13, wherein the static device includes a convex cover between the sorting augers.

15. A cane pickup and separation device mountable to a vehicle and including:
   a pair of augers with auger tips that are adapted to be positioned slightly above ground level, the pair of augers diverging relative to one another and inclined upwardly and rearwardly at a steeply inclined angle to the horizontal to define a diverging gap;
   an upwardly and rearwardly inclined separation wall rearward of the pair of augers and extending substantially across the diverging gap; and
   a frame mountable to the vehicle and adapted to support the pair of augers and the rearwardly inclined separation wall,
   wherein:
      the cane pickup and separation device further includes at least one pickup spiral set at a shallower inclination to the horizontal than the steeply inclined angle;
      the pickup spiral and pair of augers are collectively adapted to make first contact with a harvest material at a pickup zone;
      in a transition between the pickup zone and a separation zone, a transition zone is adapted to move the harvest material from the pickup zone to the separation zone; and
      each of the pickup spiral and the pair of augers of the separation device maintain contact with the collective harvest material through the transition zone.

16. A frame adapted to be mounted to a front end of a mobile agricultural vehicle, the frame including:
   a lower left mount adapted to support a rotatable left side sorting auger;
   an upper left side support for holding an upper portion of the rotatable left side sorting auger, a left intermediate region between the lower left mount and the upper left side support extending through a left longitudinal axis and defining a left side of a sorting zone;
   a lower right side mount adapted to support a rotatable right side sorting auger;
   an upper right side support for holding an upper portion of the rotatable right side sorting auger, a right intermediate region between the lower right side mount and the upper right side support extending through a right longitudinal axis and defining a right side of the sorting zone; and
   a sorting wall extending behind the left and right intermediate regions, wherein the frame further includes:
      a central lower mount to support a rotatable pickup spiral; and
      an upper support for holding an upper portion of the rotatable pickup spiral,
      the central lower mount and upper support adapted to orient the rotatable pickup spiral at a shallower inclination to the horizontal than an inclination of the left and right longitudinal axes,
      wherein:
         the pickup spiral, the rotatable left side sorting auger and the left side sorting auger are collectively adapted to make first contact with a harvest material at a pickup zone;
         in a transition between the pickup zone and the sorting zone, a transition zone is adapted to move the harvest material from the pickup zone to the sorting zone; and
         each of the pickup spiral, the rotatable left side sorting auger and the left side sorting auger maintain contact with the collective harvest material through the transition zone.

17. A cane pickup and separation device mountable to a cane harvester and including:
   a pair of sorting augers with auger tips that are adapted to be positioned a pre-set approximate height above ground level, the augers diverging relative to one another and inclined upwardly and rearwardly at an inclined angle to the horizontal to define an upwardly diverging gap,
   an upwardly and rearwardly inclined separation backing wall rearward of the pair of augers and extending substantially across the diverging gap to define, with the sorting augers, a sorting zone; and
   a frame mountable to a front end of the cane harvester and adapted to support the pair of augers and the separation wall,
   wherein:
      the device further includes at least one pickup spiral set at a shallower inclination to the horizontal than the steeply inclined angle;

the pickup spiral and pair of sorting augers are collectively adapted to make first contact with a harvest material at a pickup zone;

in a transition between the pickup zone and the sorting zone, a transition zone is adapted to move the harvest material from the pickup zone to the sorting zone; and each of the pickup spiral and the pair of sorting augers of the separation device maintain contact with the collective harvest material through the transition zone.

\* \* \* \* \*